(12) United States Patent
Weintraub (10) Patent No.: US 11,005,889 B1
(45) Date of Patent: May 11, 2021

(54) CONSENSUS-BASED POLICY MANAGEMENT

(71) Applicant: BlueTalon, Inc., Redwood City, CA (US)

(72) Inventor: Benjamin L. Weintraub, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 423 days.

(21) Appl. No.: 15/887,895

(22) Filed: Feb. 2, 2018

(51) Int. Cl.
*H04L 29/06* (2006.01)
*G06F 21/62* (2013.01)
*H04L 12/24* (2006.01)
*G06F 16/93* (2019.01)

(52) U.S. Cl.
CPC .............. *H04L 63/20* (2013.01); *G06F 16/93* (2019.01); *G06F 21/62* (2013.01); *H04L 41/0893* (2013.01); *H04L 63/102* (2013.01); *H04L 2209/38* (2013.01)

(58) Field of Classification Search
CPC ................................. H04L 63/20; G06F 16/93
See application file for complete search history.

(56) References Cited

U.S. PATENT DOCUMENTS

| | | | |
|---|---|---|---|
| 5,537,548 A | 7/1996 | Fin | |
| 5,870,764 A * | 2/1999 | Lo | G06F 16/00 |
| 6,463,470 B1 | 10/2002 | Mohaban | |
| 6,687,229 B1 | 2/2004 | Kataria | |
| 6,968,389 B1 * | 11/2005 | Menditto | H04L 29/12066 709/219 |
| 7,185,192 B1 | 2/2007 | Kahn | |
| 7,542,943 B2 | 6/2009 | Caplan | |
| 7,631,084 B2 | 12/2009 | Thomas | |
| 7,698,274 B1 * | 4/2010 | Maluf | G06F 16/93 707/999.009 |
| 7,730,089 B2 | 6/2010 | Campbell | |
| 7,783,973 B2 * | 8/2010 | Banavar | G06Q 10/06 715/255 |
| 8,181,221 B2 | 5/2012 | Manickam et al. | |

(Continued)

OTHER PUBLICATIONS

PCT International Search Report in International Application No. PCT/US2018/017698, dated May 21, 2018, 3 pages.

(Continued)

*Primary Examiner* — Zachary A. Davis
(74) *Attorney, Agent, or Firm* — Fiala & Weaver P.L.L.C.

(57) ABSTRACT

Systems, computer program products and methods implementing consensus-based policy management are described. A policy administration point communicates with multiple user devices through policy collaboration plugins. Each user device includes a computer through which an administrator can edit a policy. A first user device can obtain a policy from the policy administration point for editing. The first user device stores the edited policy in a policy store. The first user device notifies one or more second user devices of the edit. Administrators on the second user devices can approve or disapprove the edit. Each second user device notifies the first user device of a respective approval or disapproval. The first user device can determine whether the edit is acceptable based on consensus. The policy store can be implemented locally to the first user device, in a centralized place, or distributed as a blockchain.

20 Claims, 3 Drawing Sheets

(56) References Cited

U.S. PATENT DOCUMENTS

| | | | |
|---|---|---|---|
| 8,613,108 B1 | 12/2013 | Aggarwal | |
| 8,677,447 B1 | 3/2014 | Zuk et al. | |
| 9,071,594 B2 | 6/2015 | Boulos et al. | |
| 9,148,417 B2* | 9/2015 | Fieweger | H04L 9/3231 |
| 9,218,406 B2* | 12/2015 | Barrall | G06F 21/6218 |
| 9,218,692 B2* | 12/2015 | Miller | G06T 17/00 |
| 9,237,170 B2* | 1/2016 | Kiang | G06F 21/554 |
| 9,354,769 B1* | 5/2016 | Kudva | H04L 12/1822 |
| 9,483,451 B2* | 11/2016 | Frew | G06F 11/30 |
| 9,678,617 B2* | 6/2017 | Soon-Shiong | G06F 3/03 |
| 9,785,669 B2 | 10/2017 | Buschman | |
| 9,866,592 B2 | 1/2018 | Arumugam et al. | |
| 9,871,825 B2 | 1/2018 | Arumugam et al. | |
| 10,091,212 B2 | 10/2018 | Weintraub et al. | |
| 10,241,989 B2* | 3/2019 | Goyal | G06F 40/197 |
| 10,547,457 B1* | 1/2020 | Duccini | H04L 9/3268 |
| 10,635,744 B2* | 4/2020 | Beth | G06F 16/93 |
| 2001/0039594 A1* | 11/2001 | Park | G06F 8/20 |
| | | | 719/311 |
| 2002/0007404 A1 | 1/2002 | Vange | |
| 2002/0019828 A1 | 2/2002 | Mortl | |
| 2002/0169907 A1 | 11/2002 | Candea | |
| 2003/0018786 A1 | 1/2003 | Lortz | |
| 2003/0021283 A1 | 1/2003 | See | |
| 2003/0046315 A1 | 3/2003 | Feig | |
| 2003/0046639 A1* | 3/2003 | Fai | G06Q 10/10 |
| 2003/0115322 A1 | 6/2003 | Moriconi | |
| 2004/0039736 A1 | 2/2004 | Kilmer et al. | |
| 2004/0054791 A1 | 3/2004 | Chakraborty | |
| 2004/0073668 A1 | 4/2004 | Bhat | |
| 2004/0088560 A1 | 5/2004 | Danks | |
| 2005/0021978 A1* | 1/2005 | Bhat | G06F 21/6227 |
| | | | 713/182 |
| 2005/0091212 A1 | 4/2005 | Mohamed et al. | |
| 2006/0053216 A1 | 3/2006 | Deokar | |
| 2006/0218149 A1 | 9/2006 | Patrick | |
| 2006/0277220 A1 | 12/2006 | Patrick et al. | |
| 2007/0124797 A1 | 5/2007 | Gupta | |
| 2007/0174831 A1 | 7/2007 | Lee | |
| 2007/0234408 A1 | 10/2007 | Burch | |
| 2008/0066148 A1 | 3/2008 | Lim | |
| 2008/0301437 A1 | 12/2008 | Chevallier | |
| 2009/0049512 A1 | 2/2009 | Manickam et al. | |
| 2009/0193035 A1* | 7/2009 | Benayon | G06F 16/258 |
| 2009/0199302 A1 | 8/2009 | So et al. | |
| 2010/0024019 A1 | 1/2010 | Backlund | |
| 2010/0235396 A1 | 9/2010 | Chaurasia et al. | |
| 2010/0281524 A1 | 11/2010 | Ghittino | |
| 2010/0313239 A1 | 12/2010 | Chakra et al. | |
| 2011/0072486 A1 | 3/2011 | Hadar et al. | |
| 2011/0209194 A1 | 8/2011 | Kennedy | |
| 2011/0251992 A1 | 10/2011 | Bethlehem et al. | |
| 2011/0313981 A1 | 12/2011 | Ben-Natan | |
| 2012/0198467 A1 | 8/2012 | Jackson | |
| 2013/0054642 A1 | 2/2013 | Morin | |
| 2013/0117313 A1 | 5/2013 | Miao | |
| 2013/0144901 A1 | 6/2013 | Ho | |
| 2013/0332982 A1 | 12/2013 | Rao et al. | |
| 2014/0052749 A1 | 2/2014 | Rissanen | |
| 2014/0068699 A1 | 3/2014 | Balacheff | |
| 2014/0090085 A1 | 3/2014 | Mattsson et al. | |
| 2014/0128053 A1 | 5/2014 | Merchant | |
| 2014/0129936 A1 | 5/2014 | Richards et al. | |
| 2014/0196115 A1 | 7/2014 | Pelykh | |
| 2014/0351573 A1 | 11/2014 | Martini | |
| 2015/0113010 A1 | 4/2015 | Muthyala et al. | |
| 2015/0128205 A1 | 5/2015 | Mahaffey | |
| 2015/0200922 A1 | 7/2015 | Eschbach et al. | |
| 2016/0048486 A1* | 2/2016 | Lopategui | G06F 40/197 |
| | | | 715/229 |
| 2016/0085962 A1 | 3/2016 | Sokolov et al. | |
| 2016/0119349 A1 | 4/2016 | Wang et al. | |
| 2016/0149859 A1 | 5/2016 | Curtis | |
| 2016/0205101 A1 | 7/2016 | Verma et al. | |
| 2016/0342803 A1 | 11/2016 | Goodridge | |
| 2017/0012962 A1 | 1/2017 | Lissack | |
| 2017/0093925 A1 | 3/2017 | Sheretov | |
| 2017/0208033 A1 | 7/2017 | Roskind | |
| 2017/0257379 A1 | 9/2017 | Weintraub et al. | |
| 2018/0131726 A1 | 5/2018 | Arumugam et al. | |
| 2018/0131727 A1 | 5/2018 | Arumugam et al. | |
| 2018/0137465 A1* | 5/2018 | Batra | G06Q 10/103 |
| 2018/0204213 A1* | 7/2018 | Zappier | H04L 63/08 |
| 2019/0036778 A1* | 1/2019 | Bathen | H04L 41/0893 |
| 2019/0155870 A1* | 5/2019 | Prakash | G06F 40/103 |

OTHER PUBLICATIONS

International Application No. PCT/US2016/054107, Notification of Transmittal of the International Search Report and the Written Opinion of the International Searching Authority, dated Jan. 9, 2017, 13 pages.

International Application No. PCT/US2016/065853, Notification of Transmittal of the International Search Report and the Written Opinion of the International Searching Authority, dated Mar. 24, 2017, 14 pages.

International Application No. PCT/US2017/020766, Notification of Transmittal of the International Search Report and the Written Opinion of the International Searching Authority, dated Jun. 8, 2017, 12 pages.

Zeng et al., "Content-Based Access Control: Use Data Content to Assist Access Control for Large-Scale Content-Centric Databases", Oct. 2014, IEEE International Conference on Big Data, pp. 2584-2589 (2014).

Medeiros et al., "A proposal for customizing queries on XML documents based on conditional preferences," Latin American Computing Conference, dated Apr. 2015, 8 pages.

Marenco et al. "Achieving Evolvable Web-Database Bioscience Applications Using the EAV/CR Framework: Recent Advances", Journal of the American Medical Informatics Association, vol. 10, Issue 5, dated Sep. 1, 2003, 10 pages.

* cited by examiner

CONSENSUS-BASED POLICY MANAGEMENT

TECHNICAL FIELD

This application relates to computer system security techniques for distributed computing systems.

BACKGROUND

A distributed computing system can provide various services such as distributed data processing services, distributed file storage services, distributed database services, or distributed messaging services. A policy system can enforce various policies on accessing the services. For example, a policy system can allow a particular user to access a particular data item or a particular computing resource. Administrators can create and edit the policies. In a large and complex computing system, a policy can be complex and detailed. Many administrators can work on a same policy, each administrator being responsible for a portion of the policy. Conventionally, a version control system can be used to manage the policy. Each administrator can check out a policy from the version control system, edit the checked out policy, and check in the policy after finishing editing. Typically, the policy can be checked out to at most one administrator at any given time, otherwise conflict checking and merging may need to be applied. When the policy is checked out and being edited by one administrator, other administrators have no control over the editing by this administrator. Other administrators can review the edited policy after the policy is checked in.

SUMMARY

In general, this specification relates to computer system security techniques.

Systems, computer program products and methods implementing collaborative policy management are described. A policy administration point communicates with multiple user devices through policy collaboration plugins. Each user device includes a computer through which an administrator can edit a policy. A first user device can obtain a policy from the policy administration point for editing. The first user device stores the edited policy in a policy store. The first user device notifies one or more second user devices of the edit. Administrators on the second user devices can approve or disapprove the edit. Each second user device notifies the first user device of a respective approval or disapproval. The first user device can determine whether the edit is acceptable based on consensus. If the consensus indicates that the edit is approved, the first user device provides the edited policy to the policy administration point. The policy store can be a centralized database or a distributed blockchain.

Particular embodiments of the subject matter described in this specification can be implemented to realize, but are not limited to, one or more of the following example advantages. The disclosed techniques improve upon conventional policy management systems in that the disclosed techniques encourage collaboration. Unlike a conventional version control system that hides edits by one administrator from other administrators until check in, the disclosed techniques make editing visible to a group of users. This architecture improves transparency.

In addition, while a conventional version control system allows check in of any edits, the disclosed techniques allow a policy to be changed only when a consensus is reached, before check in. This architecture reduces conflicts and human error and avoids multiple version numbers that burden a version control system when a policy needs to go through multiple rounds of editing.

The disclosed techniques improve upon conventional policy management systems in that the disclosed techniques permit parallel editing. A conventional version control system typically allows only one user to edit a document, unless branching or merging is used. Multiple users will need to work on a document in a serial manner, where user B can edit the document only after user A finishes, and concurrent editing, if allowable, is discouraged. The disclosed techniques allow multiple users to work on a same policy at the same time, where user A and user B can edit a same policy at the same time. This architecture thus encourages concurrent editing and improves efficiency.

The details of one or more embodiments of the subject matter of this specification are set forth in the accompanying drawings and the description below. Other features, aspects and advantages of the subject matter will become apparent from the description, the drawings and the claims.

BRIEF DESCRIPTION OF THE DRAWINGS

Like reference numbers and designations in the various drawings indicate like elements.

DETAILED DESCRIPTION

Generally, sensitive data, such as personally identifiable data, can be stored in a file system, e.g., a Hadoop® Distributed File System (HDFS) or a database, in the cloud. Compute nodes in the cluster can operate on the sensitive data retrieved from the file system to complete tasks within a workload. There can be restrictions to read or write access for some compute nodes due to the sensitivity of the data. Some database systems can, in response to a data request from a client without authorized user credentials, send a response indicating unauthorized access to the data; such gatekeeping is performed at the central server that receives the request from the client. However, for a system that has distributed storage and processing, e.g., HDFS, it can be desirable for policies to be enforced at each compute node. In addition, it can be desirable for a compute node to receive a modified version of the data instead of a response indicating unauthorized access. For example, it can be desirable for the compute node to receive a response in which some (but not all) of the data has been masked, e.g., characters replaced with default characters or values.

Thus, a policy system integrated in a compute node can provide a masked version of the sensitive data. This can enable the compute node to access portions of the sensitive data without having the sensitive data be entirely exposed. The system is operable even where data is stored in a framework, e.g., HDFS, that includes name nodes and data nodes.

Figure 1:
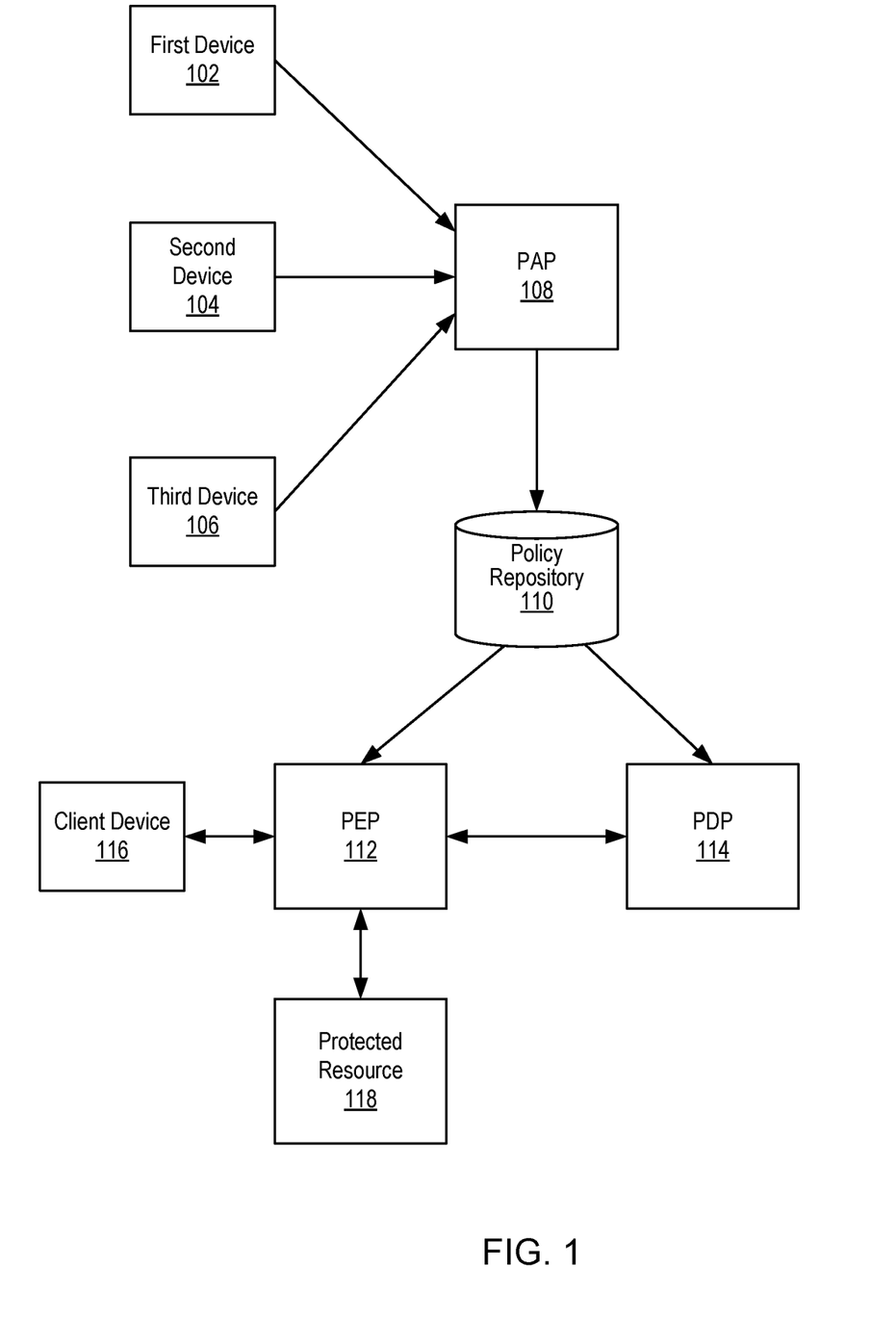
FIG. 1 is a block diagram illustrating a consensus-based policy management environment.

FIG. 1 is a block diagram illustrating a consensus-based policy management environment. Administrators manage a data access policy, or simply, a policy, using a first user device 102, a second user device 104 and a third user device 106 collaboratively and based on consensus, through transparent notification and approval, as well as parallel editing. A policy system enforces the data access policy. The policy system can include a policy administration point 108, a policy repository 110, a policy enforcement point 112, and a policy decision point 114. Each of the policy administration point 108, policy repository 110, policy enforcement point 112 and policy decision point 114 can be implemented on one or more computers.

Each administrator can be authenticated by a certificate authority (CA). The CA can allow cryptographic signatures to be verified.

The policy administration point 108 is configured to create, change and delete policies. Each policy includes a set of one or more data access rules specifying whether a user can or cannot access a resource, e.g., particular file system, a particular service, a particular database or a particular data item. Administrators, e.g., system users responsible for managing regular users' access rights, interact with the policy administration point 108 through the first user device 102, second user device 104, and third user device 106. The user devices 102, 104 and 106 receive inputs from the administrator for creating, editing and deleting policies, and submit requests to the policy administration point 108. In response to the requests, the policy administration point 108 creates, changes or deletes the policies. In contrast to conventional techniques where conflict checking and merging are performed at the level of the policy administration point 108, the disclosed techniques allow collaboration at the user devices 102, 104 and 106.

The policy administration point 108 can store the policies in a policy repository 110. In some implementations, the policy repository 110 can be a database system. In some implementations, the policy repository 110 is implemented as a distributed append-only ledger, sometimes referred to as a blockchain. Each blockchain can include an arbitrary number (greater than or equal to one) of nodes. Each blockchain can include a respective set of policies. Each administrator can interact with a blockchain of the policy repository 110 via one or more user devices.

The policy repository is configured to store one or more policies that will be enforced by a policy enforcement point 112. The policy enforcement point 112 is logically located between a client device and a file system or a database. The policy enforcement point 112 is a component of the policy system that is logically located between a client device 116 and a protected resource 118. The client device 116 is a device used by a user to access the protected resource 118. For example, the client device 116 can execute a user application that retrieves data from the protected resource 118. The client device 116 can submit a request to the protected resource 118. The request can be associated with various forms of credentials representing the user. The protected resource 118 can include a file system, e.g., an HDFS system, a database, e.g., a MySQL™ database, a cloud-based service, a data item such as a column or a row in a database table or a particular file, or other resources logically located behind the policy enforcement point 112.

The policy enforcement point 112 intercepts the request. The policy enforcement point 112 can submit the credentials and the requested data, e.g., a file system name, a database table name, a database table column name, or a combination of the above, to the policy decision point 114. The policy decision point 114 can be implemented on one or more computers configured to determine whether the user represented by the credentials is permitted to access the requested data, is prohibited from accessing the data, or has partial privileges to access the data.

In making the determination, the policy decision point 114 requests and receives one or more policies associated with the user from the policy repository 110. The policy may have various portions. For example, the policy may specify that the user has full access to a first file system, no access to a second file system, and only partial access to a particular column of a database table. The policy decision point 114 can determine that, according to the request, the user is attempting to access the first file system and that particular column of the database table. The policy decision point 114 then provides the determination to the policy enforcement point 112, including what access the user has on the column.

The policy enforcement point 112 enforces the determination by the policy decision point 114. The policy enforcement point 112, upon determining that the decision is that the requesting user is allowed to access the first file system, can pass the request from the client device 116 to the first file system, or direct the client device 116 to access the first file system directly. This mechanism can be different from a security measure implemented on the first file system. The disclosed architecture can allow centralized authentication and authorization independent of security measures implemented on various file systems.

Likewise, the policy enforcement point 112, upon determining that the decision is that the requesting user is allowed to have partial access to the database column, can limit the access to what is specified by the policy decision point 114. The policy enforcement point 112 can submit the request to the database, retrieve the data, and hide or redact data from the database column. For example, the policy decision point 114 can determine that all digits except the last four digits of a person's identification number, e.g., a social security number, shall be masked for the user requesting this number. The policy enforcement point 112 can enforce this masking rule, and change the retrieved data according to a pre-specified mask, e.g., XXX-XX-aaaa, where a personal identification number such as 123-45-6789 will be modified to XXX-XX-6789 before the policy enforcement point 112 provides the modified data back to the client device 116 in response to the request.

The various data access rules in the policy, e.g., (1) user A can access the first file system X, (2) user A cannot access the second file system Y and (3) user A can only access redacted personal identification number from a database Z, may be specified by different administrators. The different administrators, one for the first file system X, one for the second file system Y and one for the database Z, may edit the corresponding data access rules on the user devices 106, 104 and 102, respectively. Before one or more of the user devices 102, 104 and 106 finally submit the policy to the policy administration point 108, the user devices 102, 104 and 106 can collaborate, by sharing the work among the user devices 102, 104 and 106.

For example, the administrator of the database Z can edit data access rules related to the database Z for user A through the user device 102. The user device 102 retrieves a policy related to user A from the policy administration point 108, or creates one if none exists. The user device 102 presents a user interface for editing the policy. Through the user interface, the user device 102 receives an input from the administrator specifying that user A has only partial access to a column "personal ID number" in a database table "employee information." The input indicates that the first five digits of a personal identification number are to be masked by a masking string, as shown in the example above. Upon receiving the input, the user device 102 edits the database portion of the policy, and stores the edited policy locally on the user device 102. The user device 102 can perform a lookup in a registry to determine which device or devices previously indicated intent to collaborate for editing the policy of user A, or intent to collaborate for editing data access rules related to database Z, or both.

The user device 102 determines that the user device 104 and user device 106 have pre-registered with the user device 102. In response, the user device 102 submits a respective notification to each of the user device 104 and user device 106. The notification can indicate that the user device 102 has changed the policy for user A related to database Z, and what changes were made, e.g., that the administrator added a masking string for the database column specific to user A.

In response to receiving the notification, each of the user device 104 and the user device 106 can present a respective user interface for a respective administrator, to allow the administrator to approve or disapprove the change. If a user device, e.g., the user device 104, receives an input indicating that a corresponding administrator disapproves, that user device may present a user interface for receiving additional user input for reason of the disapproval, or for suggested edits to the corresponding data access rule. For example, the user device 104 may receive a suggestion from a user interface on the user device 104. The suggestion can indicate that the masking string be changed from "XXX-XX-aaaa" to "###-##-aaaa" to be consistent with existing masking implemented elsewhere in the protected resource 118, e.g., in some content stored on file system A.

The user device 104 and user device 106 can submit the respective approval or disapproval, including additional changes, if any, to the user device 102. The user device 102 can implement one or more endorsement rules specifying under what condition a policy may be finalized. The condition can include a consensus being reached. The endorsement rules can specify a voting scheme, for example, that a consensus is reached when a simple majority of user devices approve of the suggested change. The endorsement rules can specify that a consensus is reached based on a weighted average where, for example, a particular user device or a particular administrator providing a feedback has a higher weight than other user devices or administrators.

In response to determining that a consensus is reached, the user device 102 can submit the approved policy to the policy administration point 108 to store in the policy repository 110. The policy repository 110 thus serves as a general ledger of policies, each corresponding to a user, e.g., user A; a group of users, e.g., a particular development team T that includes multiple users; or a particular resource, e.g., database Z.

Likewise, the second user device 104 and the third device 106 can obtain the same policy for the user A and edit various portions of the policy. Unlike a conventional version control system, while the policy is being edited on the first user device 102, second user device 104 and third user device 106, administrators on these user devices can see changes made by other administrators through notifications, and approve or disapprove the changes on the fly. Accordingly, problematic edits such as conflicts or typographical errors can be discovered and corrected early, before the policy is checked back into the system. The early detection and correction improves efficiency of collaboration. When different user devices submit the same policy, with different changes, back to the policy administration point 108, the policy administration point 108 can merge the changes and resolve conflicts before storing the final version of the policy in the policy repository 110.

In some implementations, when the policy repository 110 is implemented as blockchains, an updated policy, or a new policy, can be uploaded into an ordering node of the blockchain. The policy repository 110 can include multiple ordering nodes. The ordering nodes can be centralized and maintain consistent ordering. A policy that is on an ordering node can be checked out and signed, using a cryptographic signature, by any user who endorses it. The user can then check in the endorsed policy and put it back on the node. Alternatively, if a policy has met a requisite endorsement threshold for a particular blockchain, the policy can be appended to a relevant policy repository blockchain.

The implementations described in reference to FIG. 1 are not the only implementations of the techniques of consensus-based policy management. For example, in various implementations, the policy administration point 108, the policy repository 110, or both, can be implemented on one or more of the user devices 102, 104 or 106, rather than at a centralized location. Additional details of such implementations are described below in reference to FIG. 2.

Figure 2:
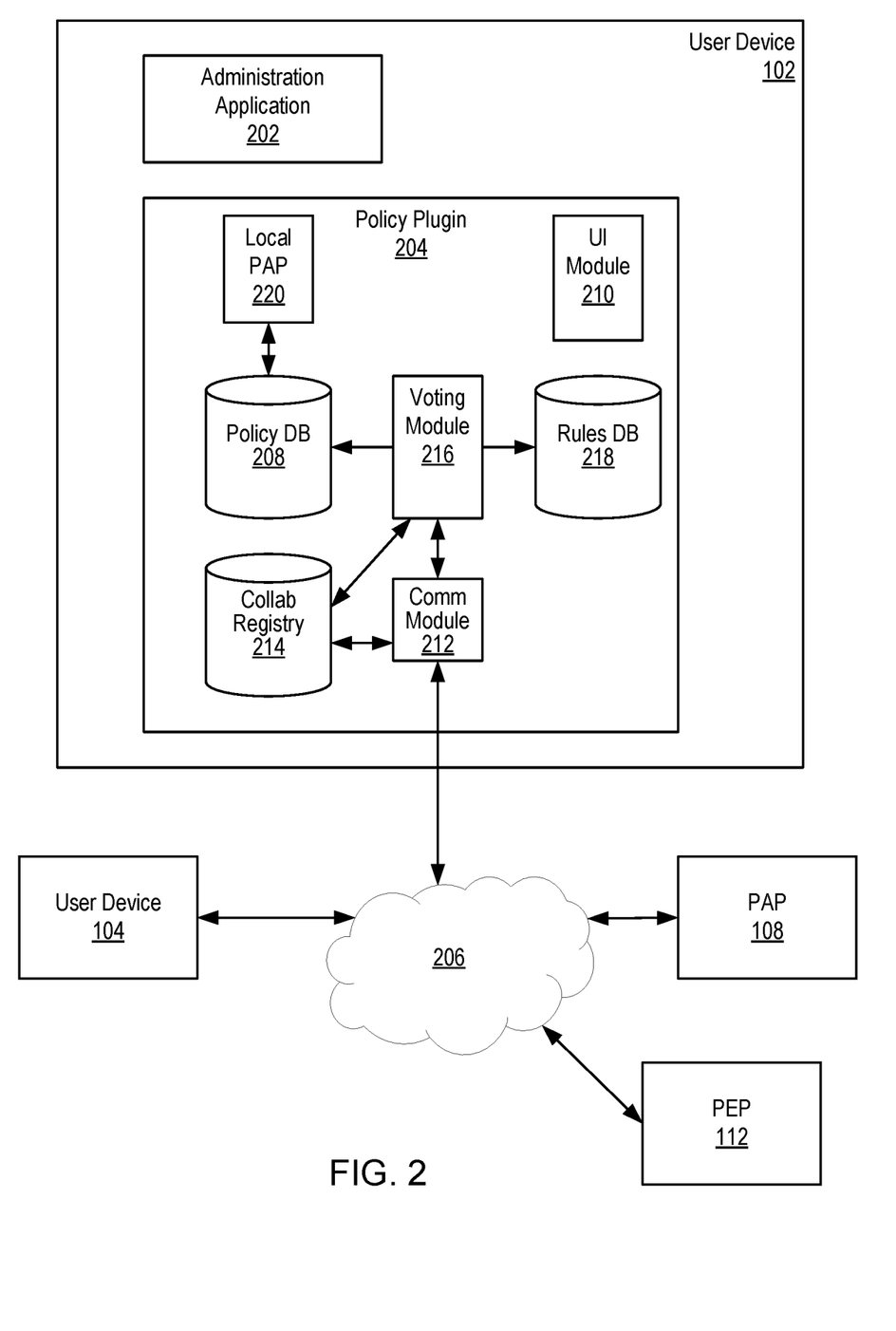
FIG. 2 is a block diagram illustrating an example user device implementing consensus-based policy management techniques.

FIG. 2 is a block diagram illustrating an example user device implementing consensus-based policy management techniques. The user device can be a desktop computer, tablet computer, smartphone, or wearable device. In this example, the user device is the user device 102 of FIG. 1.

The user device 102 can be used by an administrator managing security policies for one or more users and one or more resources. The user device 102 can execute one or more administration applications 202 to perform various administrative tasks. A policy plugin 204 including software components implemented on one or more computer processors can cause various functions of the one or more administration applications 202 to collaborate with other user devices, e.g., the user device 104, through a communications network 206.

Of the various functions that are coordinated with the user device 104, at least some functions include consensus-based policy management, where the user device 102 manages a policy for a particular user, for a particular resource, or generally, in collaboration with the user device 104. The collaboration can include viewing and editing the policy at the user device 102 while the policy is viewed and edited at the user device 104. The collaboration can include approving or disapproving, at the user device 102, changes to the policy made at the user device 104, as well as receiving approval or disapproval from the user device 104.

The mobile device 102 can receive, through a user interface module 210, a user input for editing the policy. In response, the mobile device 102 can request and receive, through a communications module 212 and the communications network 206, the policy from the policy administration point 108. Each individual user device such as the user device 102 can have its own policy administration point user interface. The user device 102 can present the policy on a user interface generated by the user interface module 210, and receive user input that edits at least a portion of the policy. The user device 102 can store the edited policy locally, in a policy store 208. The policy store 208 can include a database that stores all policies edited on the user device 102 but that have not been checked into the policy administration point 108.

Before, during, or after storing the edited policy in the policy store 208, the user device 102 can query a collaboration registry 214. The collaboration registry 214 can be a device registry implemented on a database system including one or more processors. The collaboration registry 214 is configured to store one or more references to collaborating devices. Each collaborating device can be a device, e.g., the user device 104, that has previously registered with the user device 102. The registration can indicate that collaboration in editing a particular policy for a particular user, for a particular resources, or in general, is required. The references can include, for example, names of, links to, or credentials for the collaborating devices. The collaboration registry 214 can be indexed by various keys or non-key values, e.g., a user name, e.g., user A, that is associated with a particular policy, a resource name, e.g., database Z, or a policy name. The query can identify one or more collaborating devices, e.g., the user device 104.

Upon identifying the collaborating devices including the user device 104, the communication module 212 of the user device 102 submits a request to the collaborating devices. The request can include the user name, the resource name, or the policy name. The request can indicate the change in the policy, along with an identifier of the administrator making the change, a timestamp of the change and comments, if any, associated with the change.

Upon receiving the change, the collaborating devices, including the user device 104, provide approvals or disapprovals, and optionally, comments or suggested changes, as feedback to the user device 102. The communication module 212 of the user device 102 receives the feedback, and provides the feedback to a voting module 216.

The voting module 216 is a component of the user device 102 configured to determine whether the changes to the policy, as stored in the policy store 208, can be finalized. The voting module 216 can receive one or more endorsement rules from a rule database 218. An endorsement rule can specify conditions by which a policy may be finalized. For example, a first endorsement rule can specify that if a simple majority of user devices approve of the changes, a consensus is deemed reached, and the policy can be finalized; a second endorsement rule can specify that a particular user has higher voting weight, e.g., a weight of a first administrator is 2.0, whereas weights of other administrators are 1.0 each; a third endorsement rule can specify that a consensus is deemed reached only once every registered administrator approves the change; a fourth endorsement rule can specify that a policy can be finalized with two administrator signatures or more generally, N signatures; a fifth endorsement rule can specify that that a policy can be finalized from one (or N) specific administrators and at least M other administrators, etc. Endorsement rules can be defined in a domain specific language (DSL). Each endorsement rule can be arbitrarily complex.

Different users, resources or policies can have different endorsement rules. Where the policy repository 110 (of FIG. 1) is implemented as blockchains, each blockchain can correspond to a respective endorsement rule that is unique.

The voting module 216 can make a decision according to the endorsement rule that is applicable to the particular user, resource or policy. Upon determining that the condition for finalizing the policy has been satisfied, the voting module 216 can submit the policy through the communication module 212 to the policy administration point 108 for checking in. The user device 102 can then remove the policy from the policy store 208.

Upon determining that a consensus has not been reached, the voting module 216 can present the policy and the disapproval by presentation through a user interface, to allow the administrator to further amend the policy. The voting module 216 can determine that the condition for finalizing the policy has not been satisfied due to lack of response from collaborating devices. In such situations, upon reaching a waiting time threshold, the voting module 216 can send a reminder to each non-responding device. Upon reaching a timeout threshold where the voting module 216 still has not received feedback, the voting module 216 can decide whether to finalize the policy according to a default timeout rule in the rules database 218. The default timeout rule can specify, for example, that non-responsiveness for a timeout period of one week is deemed as approval. A different default time out rule can correspond to a different user, resource, or policy.

Upon receiving the finalized policy from the user device 102, the policy administration point 108 can store the policy in a policy repository, e.g., the policy repository 110 of FIG. 1, as an enforceable policy. Collaboration can be initiated in a similar manner by user devices other than the user device 102. For example, collaboration can be initiated by the user device 104, where the user device 102 provides approval or disapproval. In this architecture, the policy can be edited concurrently in a collaborative manner across multiple user devices.

The disclosed techniques allow concurrent editing by enforcing endorsement criteria. If there are any conflicts, the disclosed techniques can resolve the conflict by forcing the conflicting content to meet the endorsement criteria. For example, if two administrators, taking two different approaches, try to update a policy concerning a particular resource, an endorsement rule can require signatures from more than 50 percent of users. Such a rule can preclude both implementations from being endorsed, because at most, only one change can receive more than 50 percent of users. It is good practice to require endorsement rules to prevent dual endorsements.

A policy system can consult whichever of the policy storage blockchains it needs, based on which endorsement rule it requires. This can be configured at installation time. The policy system can also verify that the policy endorsement is valid before loading it to a local storage. It can do so by verifying the signatures with the CA.

In some implementations, each user device maintains a local policy administration point. For example, the user device 102 can implement a local policy administration point 220. The local policy administration point 220 can perform some or all of the functions of the policy administration point 108 described in reference to FIG. 1. In particular, the local policy administration point 220 can act as a gateway to a policy repository.

Each user device can have a policy repository of its own. For example, in some implementations, the policy store 208, as each policy store on each user device, is a distributed "official" copy of a policy repository 110 (of FIG. 1). In some implementations, the centralized policy administration point 108 and policy repository 110 are implemented among user devices in a distributed manner, for example, as a local policy administration point 220 and local policy store 208. In some implementations, each policy enforcement engine, e.g., the policy enforcement point 112, can have a respective copy of a policy repository.

Each policy enforcement point 112 or policy decision point 114 can read from any or all of the policy repository 110, the policy store 208 or other policy stores local to user devices. The policy enforcement point 112 can apply whatever are the most updated policies that have met the endorsement rules.

Figure 3:
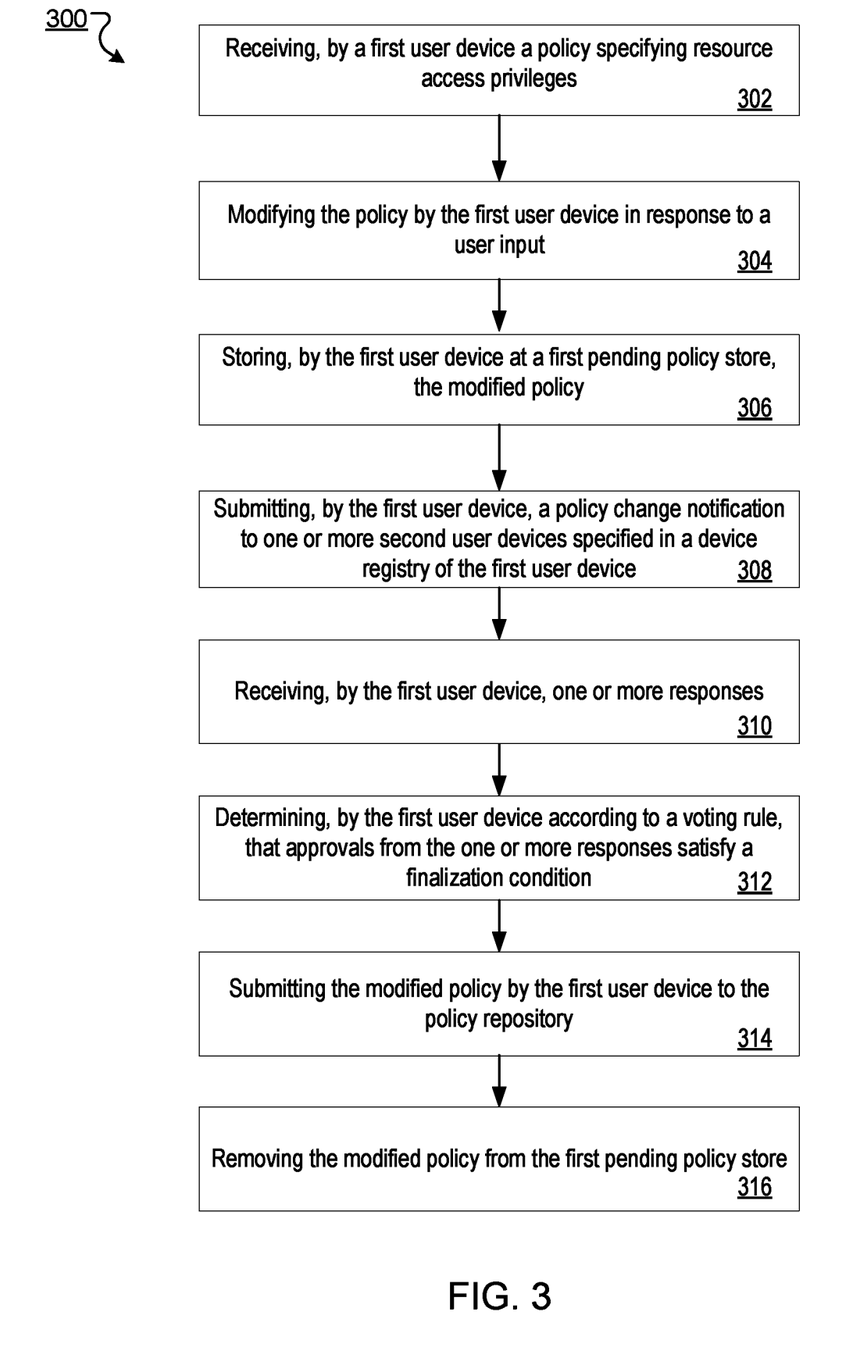
FIG. 3 is a flowchart of an example process of consensus-based policy management.

FIG. 3 is a flowchart of an example process 300 of consensus-based policy management. The process 300 can be performed by user device that includes a system of one or more processors, e.g., the user device 102 of FIG. 1 and FIG. 2.

The user device receives (302), from a policy repository, a policy specifying resource access privileges. The policy repository can be a storage node of a distributed policy system. The policy repository can be a component of a policy system including the policy repository, a policy administration point, a policy enforcement point, and a policy decision point. The policy repository can be managed by the policy administration point, e.g., the policy administration point 108 of FIG. 1, that communicates with the user device.

The user device modifies (304) the policy in response to a user input. Modifying the policy can include changing access privileges of a user associated with the policy to a particular computer resource, e.g., a column or row of a database table, between full access privileges, no access privileges, and partial access privileges. The partial access privileges can include, for example, privileges to access only at least partially masked content.

The user device stores (306) the modified policy at a first policy store, e.g., the policy store 208 of FIG. 2, which is local to the user device. Storing the modified policy locally can allow parallel editing of the policy by multiple user devices without first checking in the policy.

The user device submits (308) a policy change notification to one or more second user devices specified in a device registry of the user device. The device registry can include the collaboration registry 214 of FIG. 2, which can be pre-populated. The policy change notification is associated with the modified policy. For example, the policy change notification can indicate the modification that has been applied to the policy.

The user device receives (310) one or more responses to the policy change notification. Each response comes from a respective second user device of the one or more second user devices. The user device can present a user interface representing respective approval status, denial status or pending status of the modified policy.

The user device determines (312), according to an endorsement rule, that approvals from the one or more responses satisfy a condition for finalizing the policy. The user device can notify each of the one or more second user devices that the modified policy has been approved. If a second user device is editing the same policy, the notification can cause the modification by the first user device to propagate to the second user device, triggering a merge at the second user device. The endorsement rule can specify the condition for finalizing the policy in terms of a threshold number of user devices, a threshold percentage of user devices, or a respective weight of each user device.

Upon determining that the condition for finalizing the policy is satisfied, the user device submits (314) the modified policy to the policy repository through the policy administration point. The policy administration point can resolve a conflict between the modified policy and other modifications of the policy submitted by at least one of the one or more second user devices. The user device then removes (316) the modified policy from the policy store.

In some implementations, the user device receives, from a second user device of the one or more second user devices, a second policy change notification indicating that the second user device further modified the policy. The second policy change notification is associated with the further modified policy. The user device can store the further modified policy in the policy store. The user device can then present a user notification indicating that the further modified policy requests approval on the user device. In response to receiving a user input indicating approval or disapproval, the user device can submit the approval or disapproval to each of the one or more second user devices.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical discs, or optical discs. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical discs; and CD-ROM and DVD-ROM. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED organic light-emitting diode) display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:
    receiving, by a first user device over a network from a policy repository, a policy specifying resource access privileges;
    modifying the policy by the first user device in response to a user input;
    storing, by the first user device at a policy store of the first user device, the modified policy;

submitting, over the network by the first user device, a policy change notification to one or more additional user devices specified in a device registry of the first user device,
- the policy change notification being associated with the modified policy, and
- the device registry registering the one or more additional user devices with the policy that was modified;

receiving, by the first user device, one or more responses to the policy change notification, each response being from a respective additional user device of the one or more additional user devices;

determining, by the first user device and according to an endorsement rule, that approvals, from the one or more responses, satisfy a condition for finalizing the policy; and submitting the modified policy by the first user device to the policy repository over the network, wherein each user device comprises one or more computer processors.

2. The method of claim 1, wherein the policy repository is a component of a policy system including the policy repository, a policy administration point, a policy enforcement point and a policy decision point, each of the policy repository, the policy administration point, the policy enforcement point and the policy decision point being implemented on one or more computer processors.

3. The method of claim 2, comprising:
resolving, by the policy administration point, a conflict between the modified policy and other modifications of the policy submitted by at least one of the one or more additional user devices.

4. The method of claim 1, comprising:
notifying each of the one or more additional user devices that the modified policy has been approved.

5. The method of claim 1, comprising:
receiving, by the first user device from a second user device of the one or more additional user devices, a second policy change notification indicating that the second user device further modified the policy, the second policy change notification being associated with the further modified policy;
storing the further modified policy in the policy store;
presenting, by the first user device, a user notification indicating that the further modified policy requests approval; and
in response to receiving a user input indicating approval or disapproval, submitting the approval or disapproval by the first user device to each of the one or more additional user devices.

6. The method of claim 1, wherein the endorsement rule specifies the condition for finalizing the policy in terms of a threshold number of user devices, a threshold percentage of user devices, or a respective weight of each user device.

7. The method of claim 1, comprising presenting, by the first user device, a user interface representing respective approval status, denial status or pending status of the modified policy.

8. The method of claim 1, wherein the policy store is a policy database that is local to the first user device.

9. The method of claim 1, wherein the policy store is implemented as a blockchain.

10. The method of claim 9, wherein the blockchain includes a ledger distributed on a plurality of user devices including the first user device.

11. A non-transitory computer readable storage medium storing instructions executable by a data processing apparatus, that when executed, cause the data processing apparatus to perform operations comprising:
receiving, by a first user device over a network from a policy repository, a policy specifying resource access privileges;
modifying the policy by the first user device in response to a user input;
storing, by the first user device at a policy store of the first user device, the modified policy;
submitting, over the network by the first user device, a policy change notification to one or more additional user devices specified in a device registry of the first user device, the policy change notification being associated with the modified policy;
receiving, by the first user device, one or more responses to the policy change notification, each response being from a respective additional user device of the one or more additional user devices;
determining, by the first user device and according to an endorsement rule, that approvals, from the one or more responses, satisfy a condition for finalizing the policy; and
submitting the modified policy by the first user device to the policy repository over the network.

12. The non-transitory computer readable storage medium of claim 11, wherein said receiving, by the first user device from the policy repository, the policy specifying resource access privileges, comprises receiving from a policy system that is separate from the first user device and that includes the policy repository, a policy administration point, a policy enforcement point and a policy decision point;
each of the policy repository, the policy administration point, the policy enforcement point and the policy decision point being implemented on one or more computer processors.

13. The non-transitory computer readable storage medium of claim 12, the operations comprising:
resolving, by the policy administration point, a conflict between the modified policy and other modifications of the policy submitted by at least one of the one or more additional user devices.

14. The non-transitory computer readable storage medium of claim 11, the operations comprising:
notifying each of the one or more additional user devices that the modified policy has been approved.

15. A system comprising:
one or more computers and one or more storage devices, respectively of the one or more computers, on which are stored instructions that are operable, when executed by the one or more computers, to cause the one or more computers to perform operations comprising:
receiving, by a first user device of the one or more computers over a network from a policy repository, a policy specifying resource access privileges;
modifying the policy by the first user device in response to a user input;
storing, by the first user device at a policy store of the one or more storage devices that corresponds to the first user device, the modified policy;
submitting, over the network by the first user device, a policy change notification to one or more additional user devices, of the one or more computers, specified in a device registry of the first user device, the policy change notification being associated with the modified policy;

receiving, by the first user device, one or more responses to the policy change notification, each response being from a respective additional user device of the one or more additional user devices;

determining, by the first user device and according to an endorsement rule, that approvals, from the one or more responses, satisfy a condition for finalizing the policy; and submitting the modified policy by the first user device to the policy repository over the network.

16. The system of claim 15, wherein said receiving, by the first user device of the one or more computers from the policy repository, the policy specifying resource access privileges, comprises receiving from a policy system including the policy repository, a policy administration point, a policy enforcement point and a policy decision point, each of the policy repository, the policy administration point, the policy enforcement point and the policy decision point being implemented on one or more computer processors.

17. The system of claim 16, the operations comprising:
resolving, by the policy administration point, a conflict between the modified policy and other modifications of the policy submitted by at least one of the one or more additional user devices.

18. The system of claim 15, the operations comprising:
notifying each of the one or more additional user devices that the modified policy has been approved.

19. The system of claim 15, the operations comprising:
receiving, by the first user device from a second user device of the one or more additional user devices, a second policy change notification indicating that the second user device further modified the policy, the second policy change notification being associated with the further modified policy;

storing the further modified policy in the policy store;

presenting, by the first user device, a user notification indicating that the further modified policy requests approval; and in response to receiving a user input indicating approval or disapproval, submitting the approval or disapproval by the first user device to each of the one or more additional user devices.

20. The system of claim 15, wherein the endorsement rule specifies the condition for finalizing the policy in terms of a threshold number of user devices, a threshold percentage of user devices, or a respective weight of each user device.

* * * * *